(12) United States Patent
Mehalingam et al.

(10) Patent No.: US 9,436,664 B2
(45) Date of Patent: Sep. 6, 2016

(54) PERFORMING MULTIPLE SCOPE BASED SEARCH AND REPLACE WITHIN A DOCUMENT

(71) Applicant: Tata Consultancy Services Limited, Maharashtra (IN)

(72) Inventors: Tamildurai Mehalingam, Chennai (IN); Muthukumar Ezhumalai, Chennai (IN); Rekha Kothandaraman, Chennai (IN)

(73) Assignee: Tata Consultancy Services Limited, Maharashtra (IN)

(*) Notice: Subject to any disclaimer, the term of this patent is extended or adjusted under 35 U.S.C. 154(b) by 661 days.

(21) Appl. No.: 13/764,966

(22) Filed: Feb. 12, 2013

(65) Prior Publication Data

US 2013/0326349 A1    Dec. 5, 2013

(30) Foreign Application Priority Data

May 31, 2012    (IN) .......................... 1617/MUM/2012

(51) Int. Cl.
    *G06F 17/24*    (2006.01)
(52) U.S. Cl.
    CPC ..................... *G06F 17/24* (2013.01)
(58) Field of Classification Search
    CPC ....................................................... G06F 17/24
    See application file for complete search history.

(56) References Cited

U.S. PATENT DOCUMENTS

| | | | |
|---|---|---|---|
| 5,873,660 A | 2/1999 | Walsh | |
| 6,044,387 A | 3/2000 | Angiulo | |
| 8,145,632 B2 | 3/2012 | Dexter | |
| 8,205,149 B2 | 6/2012 | Chan et al. | |
| 8,359,533 B2 | 1/2013 | Dexter | |
| 2008/0263443 A1 | 10/2008 | Maxime | |
| 2009/0216763 A1 | 8/2009 | Dexter et al. | |
| 2010/0049710 A1* | 2/2010 | Young, Jr. ......... | G06F 17/30867 707/769 |

OTHER PUBLICATIONS

Jan Goybaerts, "PowerGREP Manual", Apr. 30, 2012, Just Great Software Co. Ltd., Version 4.3.3, pp. 1-381.*
Inforapid "Info Rapid Search and Replace".
"Find and Replace Tool for Word".
"Advanced Find and Replace".
SOBOLSOFT "MS Word Find and Replace in Multiple Documents Software".
Datamystic "Wordpipe".

* cited by examiner

*Primary Examiner* — Asher Kells
(74) *Attorney, Agent, or Firm* — Hayes Soloway PC

(57) ABSTRACT

A method and system for performing search and replace operation has been implemented. The system enables to perform multiple scope based search concurrently within plurality of documents. The system also supports multiple file formats and is able to generate reports post completion of the search and replace operation.

14 Claims, 5 Drawing Sheets

(ii) CASE 2: ONLY START PATTERN GIVEN (iii) CASE 3: ONLY END PATTERN GIVEN

PERFORMING MULTIPLE SCOPE BASED SEARCH AND REPLACE WITHIN A DOCUMENT

FIELD OF THE INVENTION

The present invention in general relates to the field of text editing. More particularly the present invention relates to 'Find and Replace' features in text editing.

BACKGROUND OF THE INVENTION

A text editor is one of the most important tools used to manage daily work. In particular specialized text editors for programming languages are required for enabling features such as syntax check, text formatting, filtering, and ability to handle encoded data. The most widely used text editors such as gedit, multiedit and the like provide basic functionalities such as text editing, cut, copy, paste, undo, redo and several other functionalities. However specialized text editors based on the user requirement are still seen at far.

During development of any code many a times there is a need to replace a particular function or a particular regular expression within the text editor with another modified one. In such scenarios the developers makes use of find and replace functionality. Till date, the existing market tools fail to provide find and replace functionality within multiple scopes based on user requirements.

In one of the publications by O'Reilly titled 'Pattern Matching with Regular Expressions', the process utilizes a JavaScript RegExp class to perform powerful pattern-matching and search-and-replace functions on text. However, the publication remains silent on implementing find and replace in multiple scopes thus making it a challenge till date.

Several find and replace tools like 'Multiple File Search and Replace 2.2' by Internet Soft Corporation and 'Powergrep' by Powergrepare is also available in the market that perform position and pattern based search. However, they do not provide warning tags especially from the perspective of code migration. Although the track mode functionality offered in Microsoft word is in similar lines with generating warning tags but implementing the same feature in a programming language is a tedious and challenging task due to the change in the type of content to be replaced. In Microsoft word the content is generally based on rules of a particular language and follows certain syntax of the language. However in a development environment the text editors must comply to the rules of all the programming languages which poses a formidable challenge for the developer.

US20080263443 of International Business Machines Corporation numbered selects inflected forms by applying pure lexico-syntactic transformations to enable find and replace feature. U.S. Pat. No. 5,873,660 checks for a search string within scope by finding the root word of the words in the search string. However these approaches fail when applied to programming languages and especially to regular expressions.

Moreover, the state of the art tools fail to comprehend to the issue of text alignment after replacement. This has been a major issue which leads to syntactical errors post migration of the code from one programming language to another programming language.

Moreover, ignoring specific portion between specific column positions say from 0th column to 6th position and 40th to 56th position and ignoring the chunks if it is present between the mentioned start and end ignore patterns of the files and searching the mentioned keywords/pattern in the remaining portion is not found implemented in the prior arts. Different file types can have different position ignoring mechanisms.

In the light of foregoing, there is a need for a tool that provides position and pattern based find and replace feature by defining multiple scopes within a text editor. Also in a development environment the demand for enabling warning tags to understand the changes made in the code is inevitable. Thus, there is a need of a solution for assisting the user to do a position and pattern based find and replace capable of replacing text within multiple scopes.

OBJECTIVES OF THE INVENTION

The principle object of the present invention is to find and replace text within multiple scopes defined by the user at one instance in multiple documents.

Another significant object of the invention is to enable pattern and position based find and replace functionality.

It is another object of the present invention to provide warning tags within a text editor post replacement of the text.

Yet another object of the invention is to ignore particular chunks of text as defined by the user in different start and end patterns.

Another object of the invention is to enable hassle free code migration process to avoid syntactical as well as logical errors in the migrated code.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. These and other features of the present invention will become more fully apparent from the following description, or may be learned by the practice of the invention as set forth hereinafter.

In one of the preferred embodiments of the present invention, a method and system for performing search and replace operation has been implemented. The system enables to perform multiple scope based search concurrently within plurality of documents. The system also supports multiple file formats and is able to generate reports post completion of the search and replace operation.

The system comprises of an input module consisting of a condition file which is accepted by the controller for processing and based on the response of the ignore block finder and scope detector the controller process the condition file. The replacing module replaces data gathered post the processing on the condition file and accordingly the report generation module will generate a summarized report concluding the search and replace operation.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific system and method disclosed in the drawings.

DETAILED DESCRIPTION OF THE INVENTION

Figure 1:
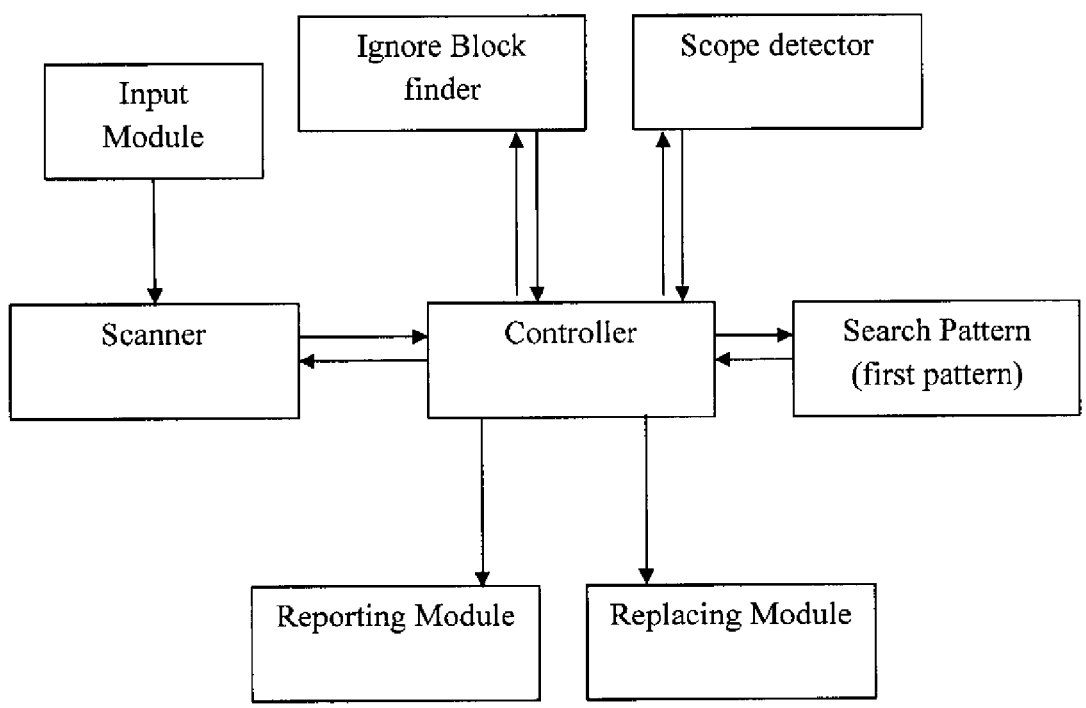
FIG. 1 depicts a component level diagram for performing the search and replace operation in accordance with one of the preferred embodiments of the present invention.
Figure 2:
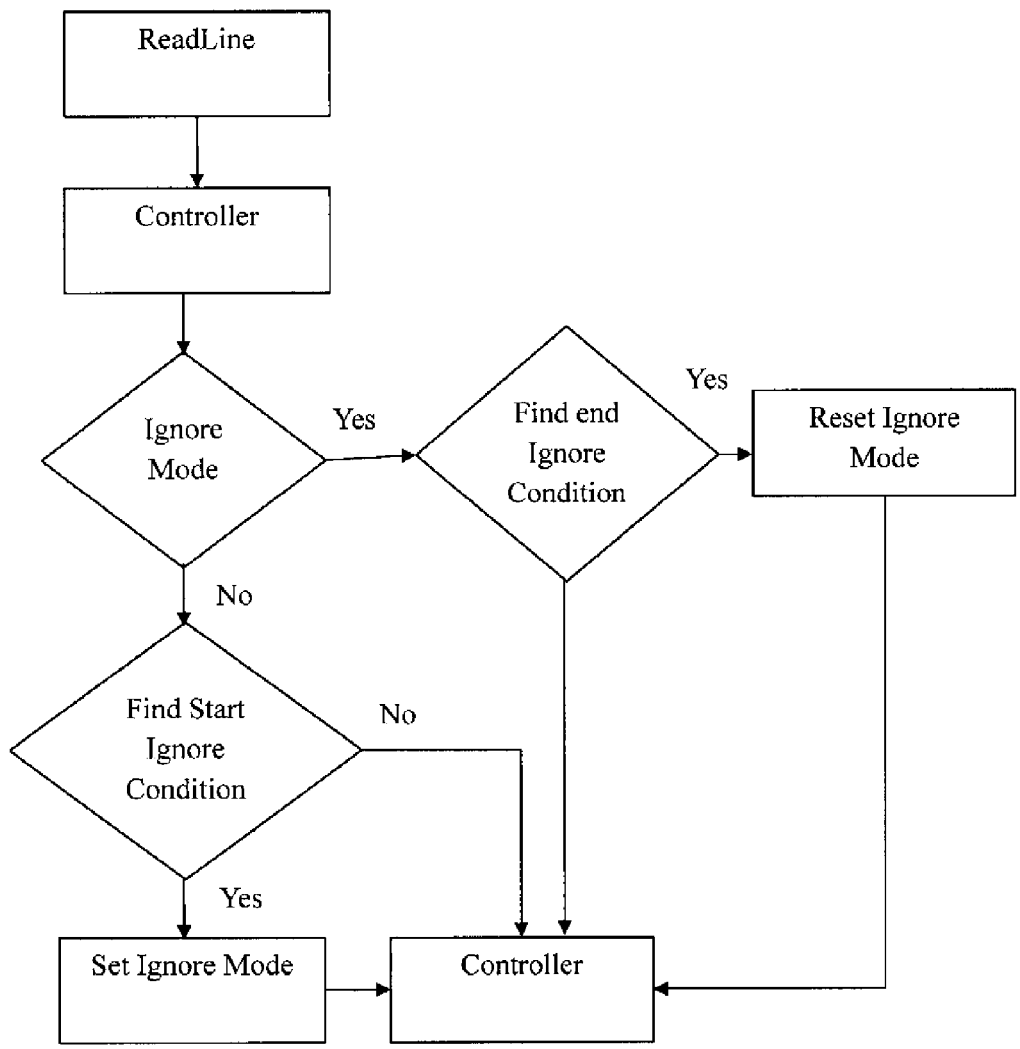
FIG. 2 illustrates the various steps involved in ignoring data specified in the condition file in accordance with one disclosed embodiments of the present invention.

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The present invention describes a system for performing multiple scope based search and replace within plurality of documents using an input module 112, a scanner 110, an ignore block finder 108, a search pattern 104 to be search within the document, a scope detector 106 and a controller 102 to manage the working of all these modules. The replacing module 114 and reporting module 116 are used to replace the search pattern found in the document and accordingly generate a consolidated report.

The input module consists of the condition file based on which the application has to work upon and the rules configuration that is specified for the find and replace.

In an embodiment the controller 102 interacts with all the other components associated with it and decide the flow of execution. Further interaction of the controller is based upon the response from one of the modules of the tool. The controller 102 is one of the key components of the system. The other major components of the system include the scanner 110, the ignore block finder 108 and the scope detector 106.

The scanner 110 reads the condition file line by line and passes the phrase to the controller for further processing.

The ignore block finder 108 now receives directions from the controller. In the first step the ignore block finder 108 checks for the 'start ignore condition' and if the phrase is found it sets the tool to 'Ignore Mode'. In step 2 the ignore block finder finds the 'end ignore condition'. The ignore block finder ignores any kind of line till the 'end ignore condition' is satisfied and the ignore mode is reset. Accordingly the response is sent to the controller for the next process.

Figure 3A:
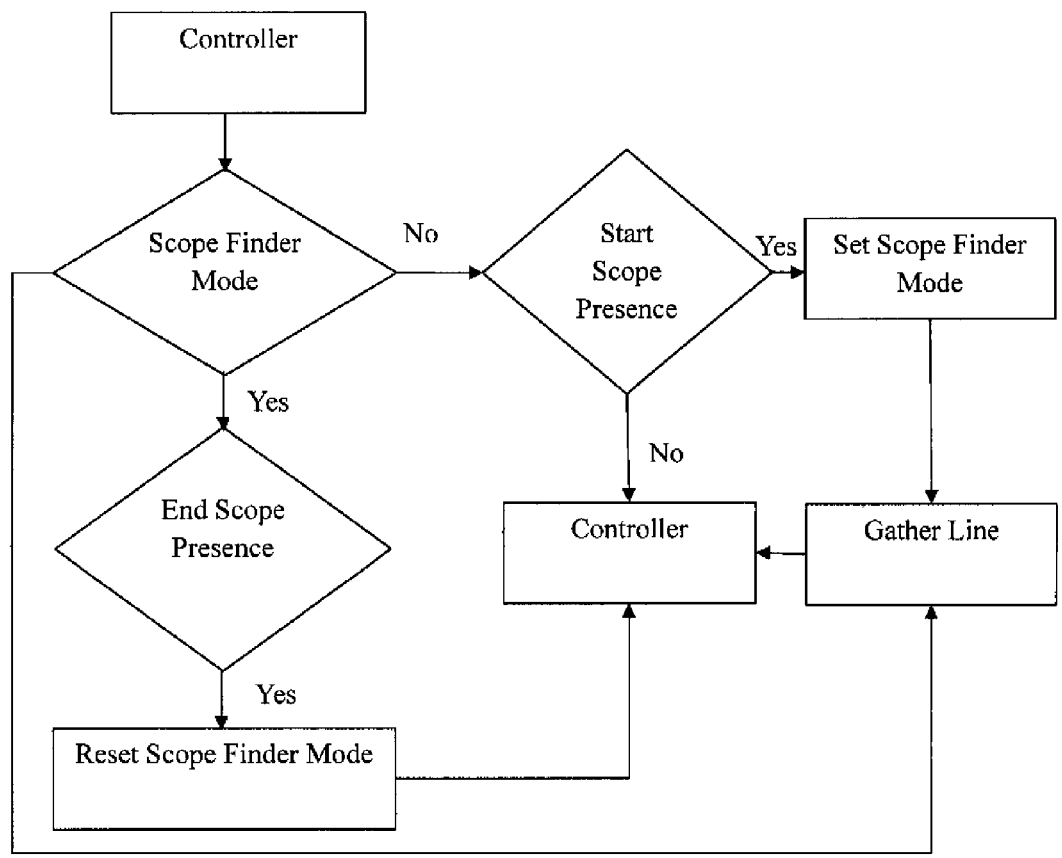
FIG. 3(a) shows the steps involved in scope detection when both the start and end pattern are provided, in accordance with one other enabled embodiment of the present invention.

The scope detector 106 considers three scenarios as listed below:

Scenario 1: Start and End pattern are specified by user.
Scenario 2: Only Start Pattern is given by user
Scenario 3: Only End Pattern is given by user Now referring to FIG. 3(a) and considering scenario 1 the controller 102 sends the input to scope detector module 106 which then checks for the 'start scope' presence and if the phrase is found it sets the tool to 'Scope Finder Mode'. Further the system tries to gather the phrase till it finds the 'end scope'. It gathers any line except ignore blocks till it finds the 'end scope'. Once the system finds the end scope, the scope finder mode is reset, and the response is sent to the controller for the next process.

Figure 3B:
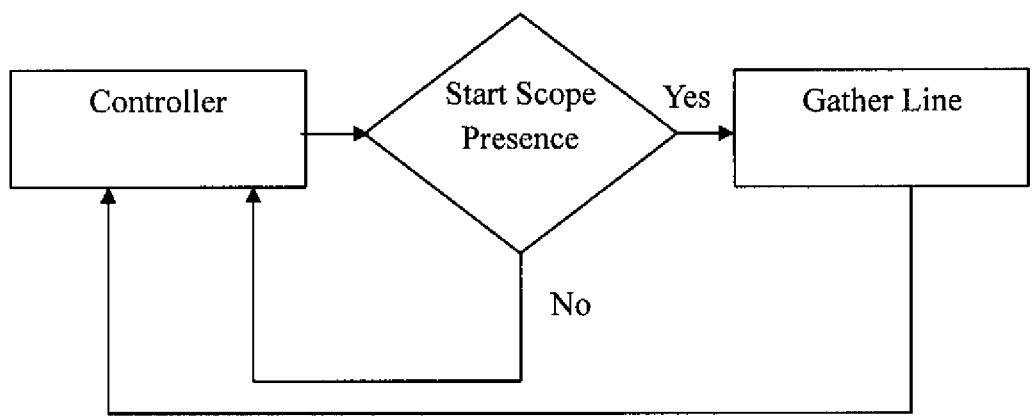
FIG. 3(b) shows the steps involved in scope detection when only the start pattern is provided, in accordance with one disclosed embodiment of the present invention.

Further referring to FIG. 3(b) and considering scenario 2 the scope detector module 106 finds the 'start scope' and once the system finds the start scope it starts gathering the condition file till end of file. Once the phrase is formed the response is sent to the controller for the next processing.

Figure 3C:
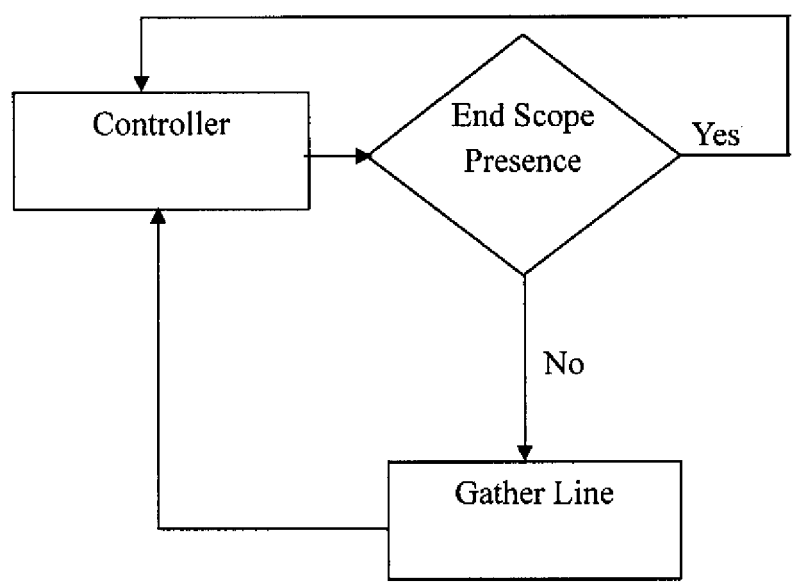
FIG. 3(c) shows the steps involved in scope detection when only the end pattern is provided, in one other disclosed embodiment of the present invention.

Referring to FIG. 3(c), and considering scenario 3 the scope detector module 106 tries to gather the condition file till the 'end scope' is found and once the system finds the end scope, the gathering activity is terminated. Once the phrase is formed the response is sent to the controller for the next step of execution process.

```
829     //now replace
830     for(int k = 0; k < listOfListOfTablePKs.size( ); k++)
831     {
832         ArrayList tablePKs = (ArrayList)listOfListOfTablePKs.get(k);
833         //the pk might already be correct; so only if removed, then
834         if(tablePKs.remove(whatToReplace) == true)
835         {
836             tablePKs.add(whatIsNbrLoanPk);
837         }
838     }//for
839
840
841     //now find the common PKs
842     for(int i = 0; i < listOfListOfTablePks.size( ); i++)
843     {
844         listOfCommonPKs.retainAll((ArrayList)listOfListOfTablePks.ge
845         ArrayList tablePKs = tablePKs.add(whatIsNbrLoanPk);
846     }//for
847
848     System.out.println("\n\n\n\n\n COMMON PKS = " + listOfCommonPKs
849     return listOfCommonPKs;
```

```
850     }//FindCommonPKs( )
                Code snippet 1(a) before position ignoring
829         //now replace
830         for(int k = 0; k < listOfListOfTablePKs.size( ); k++)
831         {
832             ArrayList tablePKs = (Arraylist)listOfListOfTablePKs.get(k);
833             //the pk might already be correct; so only if removed, then
834             if(tablePKs.remove(whatToReplace) == true)
835             {
836                 tablePKs.add(whatIsNbrLoanPk);
837             }
838         }//for
839
840
841         //now find the common PKs
842         for(int i = 0; i < listOfListOfTablePKs.size( ); i++)
843         {
844  /* sps */
845  /*          listOfCommonPKs.retainAll((Arraylist)listOfListOfTablePKs.ge
846             listOfCommonPKs.retainAll((Vector)listOfListOfTablePKs.get (i
847             ArrayList tablePKs = cablePKs.add(whatIsNbrLoanPk);
848         }//for
849
850         System.out.println("\n\n\n\n\n COMMON PKS = " + listOfCommonPKs
851         return listOfCommonPKs;
852     }//FindCommonPKs( )
853
854     ArrayList FindAllPKs(OverrideVO pOvrdVo) throws RbcidmException
855     {
                Code snippet (1b) after position ignoring
```

In one of the aspects of the invention the code snippets as shown above illustrate position ignoring capability of the tool.

Consider the following condition file provided for search and replace
FIND—ArrayList
REPLACE—Vector WARNING—sps

POSITION IGNORED—[0-40,80]

It is observed that in the 845$^{th}$ line since position ignoring till 40 characters has been configured the system has ignored the ArrayList at first but in the 844$^{th}$ line ArrayList is found after 40 and 80 characters and hence replaced.

```
742     /*
743     */
744     ArrayList FindCommonPKs(OverrideVO pOvrdVo) throws RbcidmException
745     {
746         /*ArrayList listOfOvrdTables;
747         ArrayList listOfCommonPKs;
748
749         EODAOFacadeHelper eoHlpr;
750         RBCDBManager cdwConn;
751         String tableName;
752         String removePK = "DT_SRCE_END";
753         String updtTblName = pOvrdVo.getOverrideBusinessElementsVO( ).ge
754         */
755         try
756         {
757             //find pk's for update table
758             cdwConn = new RBCDBManager( );
759             ArrayList listOfCommonPKs;
760             eoHlpr = new EODAOFacadeHelper(cdwConn);
761             listOfCommonPKs = eoHlpr.GetPrimaryKeysForTableCDW(updtTblN
762             if(listOfCommonPKs.size( ) == 0)
763             {
764                 throw new RbcidmException("ERROR: NO PK's for UpdateTab
765             }
766             listOfCommonPKs.remove(removePK);
767             //member instance copy
768             listOfUpdtTblPKs = listOfCommonPKs;
                        Code snippet (2a) before pattern ignoring
768         /*
769         */
770     /* sps */
771     /*  ArrayList FindCommonPKs(OverrideVO pOvrdVo) throws RbcidmException
772         Vector FindCommonPKs(OverrideVO pOvrdVo) throws RbcidmException
773         (
774             /*ArrayList listOfOvrdTables;
775             ArrayList listOfCommonPKs;
```

```
776
777           EODAOFacadeHelper eoHlpr;
778           RBCDBManager cdwConn;
779           String tableName;
780           String removePK = "DT_SRCE_END";
781           String updtTblName = pOvrdVo.getOverrideBusinessElementsVO( ).ge
782           */
783           try
784           {
785               //find pk's for update table
786               cdwConn = new RBCDBManager( );
787   /* sps */
788   /*       ArrayList listOfCommonPKs; */
789           Vector listOfCommonPKs;
790           eoHlpr = new EODAOFacadeHelper(cdwConn);
791           listOfCommonPKs = eoHlpr.GetPrimaryKeysForTableCDW(updtTblN
792           if(listOfCommonPKs.size( ) == 0)
793           {
794               throw new RbcidmException("ERROR: NO PK's for UpdateTab
795           }
796           listOfCommonPKs.remove(removePK);
797           //member instance copy
798           listOfUpdtTblPKs = listOfCommonPKs;
799
              Code snippet (2b) after pattern ignoring
```

In one of the aspects of the invention the code snippets as shown above illustrate the pattern ignoring capability of the tool.

Consider the condition file provided for performing the search and replace operation FIND—ArrayList
REPLACE—Vector
WARNING—sps
IGNORE START PATTERN—/*
IGNORE END PATTERN—*/

For the condition file provided above it is observed that $746^{th}$ line that even the word ArrayList is found replacement has not been done because comment is found (/*).but replacement is done in other $744^{th}$ line.

In another aspect of the invention the code snippets (3a and 3b) as shown below illustrates the process for replacing the word having same character length where space is added after the replaced word.

```
841       //now find the common PKs
842       for (int i = 0; i < listOfListOfTablePKs.size( ); i++)
843       {
844           *listOfCommonPKs.retainAll((ArrayList)listOfListOfTablePKs.
845           ArrayList tablePKs = tablePKs.add(whatIsNbrLoanPk);
846       }//for
847
848       System.out.println("\n\n\n\n\n COMMON PKS = " + listOfCommonPKs
849       return listOfCommonPKs;
850   }//FindCommonPKs( )
851
852   ArrayList FindAllPKs(OverrideVO pOvrdVo) throws RbcidmException
853   {
854       ArrayList listOfOvrdTables;
855       ArrayList listOfCommonPKs;
856
857       EODAOFacadeHelper eoHlpr;
858       RBCDBManager cdwConn;
859       String tableName;
860       String removePK = "DT_SRCE_END";
861       String updtTblName = pOvrdVo.getOverrideBusinessElementsVO( ).ge
              Code snippet (3a) before replacing
879           //now find the common PKs
880           for(int i = 0; i < listOfListOfTablePKs.size( ); i++)
881           {
882               *listOfCommonPKs.retainAll(ArrayList)listOfListOfTablePKs
883   /* sps */
884   /*           Arraylist   tablePKs = tablePKs.add(whatIsNbrLoanPk); */
885               Vec         tablePKs = tablePKs.add(whatIsNbrLoanPk);
886           }//for
887
888           System.out.println("\n\n\n\n\n COMMON PKS = " + listOfCommonPKs
889           return listOfCommonPKs;
890       }//FindCommonPKs( )
891
892   /* sps */
893   /*     ArrayList   FindAllPKs(OverrideVO pOvrdVo) throws RbcidmException */
894         Vec           FindAllPKs(OverrideVO pOvrdVo) throws RbcidmException
```

```
895            {
896   /* sps */
897   /*        ArrayList   listOfOvrdTables; */
898             Vec         listOfOvrdTables;
899   /* sps */
900   /*        Arraylist   listOfCommonPKs; */
901             Vec         listOfCommonPKs;
902
903             EODAOFacadeHelper eoHlpr;
904             RBCDBManager cdwConn;
905             String tableName;
906             String removePK = "DT_SRCE_END";
907             String updtTblName = pOvrdVo.getOverrideBusinessElementsVO( ).ge
908
```
Code snippet (3b) after replacing Consider the condition file provided as below
FIND—ArrayList
REPLACE—Vec
WARNING—sps
SPACE AFTER—Yes
With regard to the code snippets as shown above it needs to be noted that in the 855th line that the word ArrayList has been replaced with Vec and then Space has been added after the replacement.

In another aspect of the invention the code snippets (4a and 4b) as shown below illustrates the process for replacing word having same character length but space is added before the replaced word.

```
841    //now find the common PKs
842    for(int i = 0; i < listOfListOfTablePKs.size( ); i++)
843    {
844        *listOfCommonPKs.retainAll((ArrayList) listOfListOfTablePKs.
845        ArrayList tablePKs = tablePKs.add(whatIsNbrLoanPk);
846    }//for
847
848    System.out.println("\n\n\n\n\n COMMON PKS = " + listOfCommonPKs
849    return listOfCommonPKs;
850  }//FindCommonPKs( )
851
852  ArrayList FindAllPKs(OverrideVO pOvrdVo) throws RbcidmException
853  {
854       ArrayList listOfOvrdTables;
855       ArrayList listOfCommonPKs;
```
Code snippets (4a) before replacing
```
879        //now find the common PKs
880        for(int i = 0; i < listOfListOfTablePKs.size( ); i++)
881        {
882            *listOfCommonPKs.retainAll((ArrayList)listOfListOfTablePKs.
883  /* sps */
884  /*        Arraylist          tablePKs = tablePKs.add(whatIsNbrLoanPk); */
885                    Vec        tablePKs = tablePKs.add(whatIsNbrLoanPk);
886            }//for
887
888            System.out.println("\n\n\n\n\n COMMON PKS = " + listOfCommonPKs
889            return listOfCommonPKs;
890        }//FindCommonPKs( )
891
892  /* sps */
893  /*     ArrayList   FindAllPKs(OverrideVO pOvrdVo) throws RbcidmException */
894          Vec        FindAllPks(OverrideVO pOvrdVo) thows RbcidmException
895       {
896  /* sps */
897  /*        ArrayList   listOfOvrdTables; */
898             Vec        listOfOvrdTables;
899  /* sps */
900  /*        ArrayList   listOfCommonPKs; */
901             Vec        listOfCommonPKs;
902
```
Code snippets (4b) after replacing Here for the condition file provided FIND—ArrayList REPLACE—Vec WARNING—sps SPACE BEFORE—yes In the code snippets (4a and 4b) shown above it must be noted the 855th line that the word ArrayList has been replaced with Vec and then Space has been added before the replacement Let us now consider the code snippets 5a, 5b and 6a and 6b as shown below that illustrate existence and non-existence of the search pattern to be replaced.

```
 1
 2      package•com.rbcidm.mf.dao;
 3
 4
 5      import•java.util.ArrayList;
 6      import•java.sql.*;
 7      import•java.util.*;
 8      import•java.io.*;
 9
10      import•com.dbcm.dbConnection.DBManager;
11      import•com.dbcm.dbConnection.RBCDBManager;
12      import•com.dbcm.rbcidm.utils.RbcidmException;
13      import•com.dbcm.rbcidm.mf.vo.*;
14
15
16      getSAFSeqNumber
17
18      getSAFSequenceReport•Name
19
20      new•Integer(5)
21
22
23      •new•Byte( )
24
25      public•class•GenerateOverrideSql
26      {
                        Code snippet 5a
 1
 2      package•com.rbcidm.mf.dao;
 3
 4
 5      *START•PHRASE•PRESENT
 6      sps
 7      import•java.util.ArrayList;
 8      import•java.sql.*;
 9      import•java.util.*;
10      import•java.io.*;
11
12      /*•sps•*/
13      /*•import•com.dbcm.dbConnection.DBManager;•*/
14      import•com.Report.dbConnection.DBManager;
15      /*•sps•*/
16      /*•import•com.dbcm.dbConnection.RBCDBManager;•*/
17      import•com.Report.dbConnection.RBCDBManager;
18      /*•sps•*/
19      /*•import•com.dbcm.rbcidm.utils.RbcidmException;•*/
20      import•com.Report.rbcidm.utils.RbcidmException;
21      /*•sps•*/
22      /*•import•com.dbcm.rbcidm.mf.vo.*;•*/
23      import•com.Report.rbcidm.mf.vo.*;
24
25
26      getSAFSeqNumber
27
28      getSAFSequenceReport•Name
29
30      new•Integer(5)
31
32
33      •new•Byte( )
34
35      public•class•GenerateOverrideSql
36      *END•PHRASE•PRESENT
37      sps
38      (
                        Code snippet 5b
```

Consider the condition file provided as below

FIND—dbcm

REPLACE—Report

WARNING—sps

STARTPHRASE—import

ENDPHRASE—public

If for the condition file the scope is limited by giving start and end phrase the replacement will be done between the start and end phrase.

```
23      new Byte( )
24
25      public class GenerateOverrideSql
26      {
27
28          private DBManager rbcConn;
29          String updateClause = "";
30          String setClause = "";
31          String whereClause = "";
32          String fromClause = "";
33          String selectClause = "";
34          String updateStatement = "";
35          String selectStatement = "";
36          boolean flagWhereClauseDone;
37          ArrayList listOfUpdtTblPKs;
38          HashMap listOfOtherTblPKsHM;
39          static String QUOTE = "";
40          static String COMMA = ",";
41
42          new Integer( );
43
44          new Short( )
45          GenerateOverrideSql(DBManager pRbcConn)
46          {
47              this.rbcConn = pRbcConn;
48              listOfOtherTblPKsHM = new HashMap( );
                        Code snippet 6a
23      new Byte( )
24      sps
25      *THE SEARCH WORD IS NOT FOUND WITHIN THE SCOPE
26      *START PHRASE PRESENT
27      public class GenerateOverrideSql
28      {
29
30          private DBManager rbcConn;
31          String updateClause = "";
32          String setClause = "";
33          String whereClause = "";
34          String fromClause = "";
35          String selectClause = "";
36          String updateStatement = "";
37          String selectStatement = "";
38          boolean flagWhereClauseDone;
39          ArrayList listOfUpdtTblPKs;
40          HashMap listOfOtherTblPKsHM;
41          static String QUOTE = "";
42          static String COMMA = ",";
43
44          new Integer( );
45      *END PHRASE PRESENT
46      sps
47          New Short ( )
                        Code snippet 6b
```

Consider the condition file provided as follows:
FIND—Hashtable
REPLACE—
WARNING—sps
STARTPHRASE—public
ENDPHRASE—new
EXISTENCE INDICATOR—N If for the condition file the scope is limited by giving start and end phrase but replacement is not done because the search word in not found and so in 24<sup>th</sup> line a warning message is thrown.

The reporting module 116 generates a consolidated warning report in a CSV format portraying information of all the condition files after the search and replace operation is performed. The table 1 as shown below illustrates the reports generated by the tool

TABLE 1

| Sr. No. | File Name | Total Count | Total automation | Total manual | Line count | Blank Lines |
|---|---|---|---|---|---|---|
| 1 | Generate_OverideSql_Input.java | 5 | 0 | 5 | 962 | 171 |
| 2 | Testing.Java | 0 | 0 | 0 | 49 | 8 |

In another aspect of the invention multiple user defined scopes can be used for pattern searching and replacing. The code snippets (7a and 7b) illustrate how multiple user defined scopes functionality can be leveraged.

```
23          new Byte( )
24
25          public class GenerateOverrideSql
26          {
27
28              private DBManager rbcConn;
29              String updateClause = "";
30              String setClause = "";
31              String whereClause = "";
32              String fromClause = "";
33              String selectClause = "";
34              String updateStatement = "";
35              String selectStatement = "";
36              boolean flagWhereClauseDone;
37              ArrayList listOfUpdtTblPKs;
38              HashMap listOfOtherTblPKsHM;
39              static String QUOTE = "";
40              static String COMMA = ",";
41
42              new Integer( );
43
                          Code snippet 7a
23          new Byte( )
24          sps
25          *START PHRASE PRESENT
26          public class GenerateOverrideSql
27          {
28
29              private DBManager rbcConn;
30              String updateClause = "";
31              String setClause = "";
32              String whereClause = "";
33              String fromClause = "";
34              String selectClause = "";
35              String updateStatement = "";
36              String selectStatement = "";
37              boolean flagWhereClauseDone;
38              /* sps */
39              /* ArrayList listOfUpdtTblPKs; */
40              Vector listOfUpdtTblPKs;
41              HashMap listOfOtherTblPKsHM;
42              static String QUOTE = "";
43              static String COMMA = ",";
44
45              new Integer( );
46          *END PHRASE PRESENT
47          sps
                          Code snippet 7b
```

Consider the condition file provided as follows
FIND—ArrayList
REPLACE—Vector
WARNING—sps
STARTPHRASE—public+static
ENDPHRASE—new+hashtable In this case there are two start and end phrases and so the system will check for any of the condition and then output will be obtained.

In another aspect of the invention warning tags are generated as illustrated in the code snippets (8a and 8b) below. The user can avail the search and replace functionality without the warning tags as illustrated in code snippets (9a and 9b).

```
1
2       package•com.dbcm.rbcidm.mf.dao;
3
4
5       import•java.util.ArrayList;
6       import•java.sql.*;
7       import•java.util.*;
8       import•java.io.*;
9
10      import•com.dbcm.dbConnection.DBManager;
11      import•com.dbcm.dbConnection.RBCDBManger;
12      import•com.dbcm.rbcidm.utils.RbcidmException;
13      import•com.dbcm.rbcidm.mf.vo.*;
                          Code snippet 8a
1
2       /*•sps•*/
3       /*•package•com.dbcm.rbcidm.mf.dao;•*/
4       package•com.Report.rbcidm.mf.dao;
5
6
7       import•java.util.ArrayList;
8       import•java.sql.*;
9       import•java.util.*;
10      import•java.io.*;
11
12      /*•sps•*/
13      /*•import•com.dbcm.dbConnection.DBManager;•*/
14      import•com.Report.dbConnection.DBManager;
15      /*•sps•*/
16      /*•import•com.dbcm.dbConnection.RBCDBManager;•*/
17      import•com.Report.dbConnection.RBCDBManager;
18      /*•sps•*/
19      /*•import•com.dbcm.rbcidm.utils.RbcidmException;•*/
20      import•com.Report.rbcidm.utils.RbcidmException;
21      /*•sps•*/
22      /*•import•com.dbcm.rbcidm.mf.vo.*;•*/
```

```
23     import•com.Report.rbcidm.mf.vo.*;
24
                     Code snippet 8b
```

Consider the condition file provided as below
FIND—dbcm
REPLACE—Report
WARNING—sps
WARNING TAG—YES Depending upon the user requirement warning tags can be inserted in the output file as shown in code snippet 8b or can be discarded as shown in code snippet 9b along with the replacement.

```
1
2      package•com.dbcm.rbcidm.mf.dao;
3
4
5      import•java.util.ArrayList;
6      import•java.sql.*;
7      import•java.util.*;
8      import•java.io.*;
9
10     import•com.dbcm.dbConnection.DBManager;
11     import•com.dbcm.dbConnection.RBCDBManager;
12     import•com.dbcm.rbcidm.utils.RbcidmException;
13     import•com.dbcm.rbcidm.mf.vo.*;
14
              Code snippet 9a (before replacing)
1
2      package•com.Report.rbcidm.mf.dao;
3
4
5      import•java.util.ArrayList;
6      import•java.sql.*;
7      import•java.util.*;
8      import•java.io.*;
9
10     import•com.Report.dbConnection.DBManger;
11     import•com.Report.dbConnection.RBCDBManager;
12     import•com.Report.rbcidm.utils.RbcidmException;
13     import•com.Report.rbcidm.mf.vo.*;
              Code snippet 9b (after replacing)
```

Here for the condition file provided
FIND—dbcm
REPLACE—Report
WARNING—sps
WARNING TAG—NO The replacing module replaces the pattern matched with the word that has to be replaced. Here if space alignment is needed then length of the matched pattern is calculated and as per the need either appending spaces or truncating few characters happens.

Space alignment is mandatory for many languages. In such programming languages find and replace with alignment has to happen. When we find a pattern that has to be replaced the length of the pattern matched is calculated and if it does not match the length of the replace pattern then truncating the word or appending spaces happen and thereby space alignment is kept.

The reporting module takes all the details of patterns that are found and a place it has been replace by the replacing module etc and prints the consolidated details as reports.

Advantages

The advantages associated with the mentioned process and system is as mentioned below:
  Technical files find and replace are challenging and tedious. This tool can reduce effort in places like this.
  The tool can be used in programming languages like C, JAVA, XML, COBOL, etc.,
  Features helps in application assessment. Technical component assessment could be achieved which will be of a great help in project estimation and planning.
  The tool can be used in Language up-gradation and migration aspects.
  This tool can also run in batch mode without GUI and hence can be a plug-in for any other tool.

The invention claimed is:

1. A computer implemented method to perform a search and replace operation concurrently within a plurality of documents, the search and replace operation being subjected to a predefined scope and a condition file, the method comprising:
  selecting at least one document from amongst the plurality of documents to perform the search and replace operation;
  deriving the condition file from the at least one document, the condition file comprising a set of search and ignore conditions;
  specifying a plurality of search positions within the at least one document, each search position adapted to limit the traversal of the search operation within the at least one document for a predefined position;
  caching each of the search positions and data located therein in a dynamic memory, wherein the dynamic memory is coupled to a controller;
  identifying and replacing a first pattern in the at least one document with a second pattern based upon the cached data, wherein the second pattern is identified by inserting at least one configurable warning tag for each search position, and wherein the at least one configurable warning tag notifies changes in the lines in the condition file based on the replaced first pattern; and
  generating at least one search and replacement report in a consolidated form illustrating a set of changes occurred post the replacing of the first pattern in the at least one document with the second pattern based upon the cached data.

2. The method of claim 1, further comprising alignment of spaces by analyzing the second pattern for a length of characters contained within the second pattern.

3. The method of claim 1, wherein the first pattern refers to the characters to be searched within the at least one document and the second pattern refers to the characters to be replaced within the at least one document.

4. The method of claim 1, wherein the predefined position refer to providing details of line numbers within the at least one document wherein the first pattern is replaced by the second pattern.

5. The method of claim 1, wherein the search operation for the predefined position is further governed by a set of properties comprising at least one of string found, line number and file name.

6. The method of claim 1, wherein changes in lines in the condition file are identified without inserting the at least one configurable warning tag in the condition file before the changes in the lines.

7. The method of claim 1, further comprising specifying and performing an operation of ignoring a specific portion across a plurality of multiple types of documents concurrently.

8. A search and replace system embedded in a non-transitory computer-readable storage medium to perform multiple scope based search and replace operations concurrently within a plurality of documents, the system comprising:

an input module coupled to a scanner for identifying first pattern to be searched and second pattern to be replaced within at least one document from amongst a plurality of documents;

an ignore block finder and a scope detector for processing the at least one document, wherein the ignore block finder is communicatively coupled to a controller and configured to check search and ignore conditions in a condition file to be used by the scope detector for defining a first pattern to be searched within the at least one document for replacement, and wherein the scope detector is linked to the controller and adapted to gather cached data from at least one document specifying one or more conditions for the first pattern to be searched and replaced with a second pattern based upon cached data, wherein the second pattern is identified by inserting at least one configurable warning tag for each search position, and wherein the at least one configurable warning tag notifies the changes in the lines in the condition file based on the replaced first pattern;

a replacing module configured to replace the cached data as per the condition file; and a reporting module to generate a consolidated report illustrating changes occurred post the replacing the first pattern in the at least one document with the second pattern based upon the cached data.

9. The system of claim 8, wherein the controller executes computer executable code and based upon the interaction with other components performs search and replace operations.

10. The system of claim 8, wherein the scanner reads the condition file line by line and passes a phrase to the controller for further processing.

11. The system of claim 8, wherein the first pattern refers to characters to be searched within the document and the second pattern refers to characters to be replaced within the document.

12. The system of claim 8, wherein one or more condition for the first pattern comprises at least one of a start and end pattern, a start pattern and an end pattern.

13. The system of claim 8, wherein the condition file includes the first pattern to be searched and the second pattern to be replaced.

14. The system of claim 8, wherein the consolidated report comprises CSV files including a line number, a phrase found, a replaced word and a file name.

* * * * *